United States Patent [19]

Kallergis

[11] Patent Number: 4,934,483
[45] Date of Patent: Jun. 19, 1990

[54] METHOD OF REDUCING THE OVERFLYING NOISE OF AIRPLANES HAVING A PROPELLER DRIVEN BY A PISTON ENGINE

[75] Inventor: Michael Kallergis, Braunschweig, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 259,138

[22] Filed: Oct. 18, 1988

[30] Foreign Application Priority Data

Oct. 20, 1987 [DE] Fed. Rep. of Germany ....... 3735421

[51] Int. Cl.$^5$ .............................................. F01N 1/06
[52] U.S. Cl. ..................................... 181/296; 181/206; 381/71; 244/1 N
[58] Field of Search ....................... 181/206, 207, 296; 381/71; 244/1 N

[56] References Cited

U.S. PATENT DOCUMENTS

| 1,585,218 | 5/1926 | Watanabe | 181/206 X |
| 3,685,610 | 8/1972 | Bschorr | 181/206 |
| 4,607,528 | 8/1986 | Kallergis | 381/71 X |
| 4,715,559 | 12/1987 | Fuller | 181/206 X |

FOREIGN PATENT DOCUMENTS 2009105 9/1971 Fed. Rep. of Germany .

Primary Examiner—B. R. Fuller
Attorney, Agent, or Firm—Salter & Michaelson

[57] ABSTRACT

Method of reducing the overflying noise of airplanes having a propeller driven by a piston engine. The propeller is arranged on the engine shaft in such a way that positive components of the engine sound pressure fall on negative components of the propeller sound pressure. It is preferable to use an engine/propeller combination in which the number of engine ignitions per revolution of the propeller shaft divided by the number of the propeller blades is an integer, preferably being equal to 1.

5 Claims, 3 Drawing Sheets

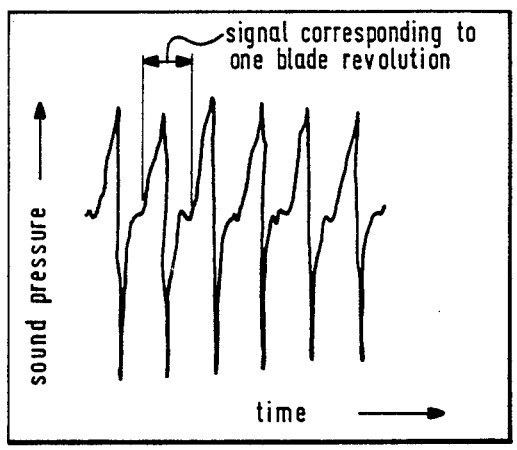
Fig. 1
Fig. 2
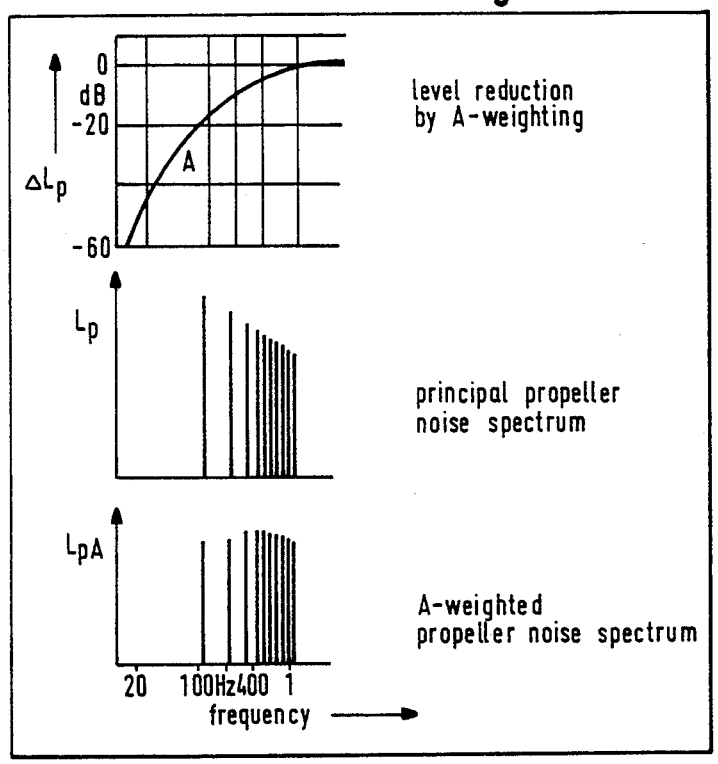

| drive | 4-stroke | 2-stroke | | | | | |
|---|---|---|---|---|---|---|---|
| | direct | direct | | | reduction 2:1 | | |
| cyl. | 4 | 6 | 2 | 3 | 4 | 2 | 3 | 4 |
| C \ B | 2 | 3 | 2 | 3 | 4 | 1 | 1,5 | 2 |
| 2 | 1 | - | 1 | - | 2 | 2 | - | 1 |
| 3 | - | 1 | - | 1 | - | 3 | 2 | - |
| 4 | 2 | - | 2 | - | 1 | 4 | - | 2 | relation B/C with

B = number of blade pressure signals per revolution of propeller shaft

C = number of cylinder pressure signals per revolution of propeller shaft

Fig. 6

METHOD OF REDUCING THE OVERFLYING NOISE OF AIRPLANES HAVING A PROPELLER DRIVEN BY A PISTON ENGINE

BACKGROUND OF THE INVENTION

The invention relates to a method according to the preamble of the patent claim 1, and a device for carrying out the method.

The propeller drive dominates as drive for airplanes having cruising speeds of below about 300 km/h. These airplanes are, in the military sphere, especially transport airplanes and propeller-driven remote-controlled missiles, and in the civil sphere, sports planes and business cruise airplanes. In the civil sphere, the noise emission of these airplanes is seen as a nuisance by the population in the vicinity of airports, not least owing to the large number of flight movements, and to the often low flying altitude.

With smaller propeller airplanes of general aviation, the important noises are emitted by the engine exhaust and by the propeller. The noise emission from the engine exhaust is normally reduced by sound muffling.

In order to diminish the noise emission, which is based mainly on the propeller noise, it is known in a method according to the preamble of the patent claim 1, to generate, and thereby extinguish, the propeller sound field by superposition of the sound fields of antisound generators of nth order, which are arranged in a fixed position to the rotor shaft, the generation being done in antiphase in terms of wave geometry and spectral distribution of direction. In this connection, separate antisound generators are employed to simulate the sound fields, for example, a pneumatically driven siren, whose rotor runs synchronously with the propeller. It is further known to construct a part of the airplane wing skin as membrane of an electrodynamic loudspeaker in the capacity of antisound generator. Such additional antisound generators are expensive and difficult to realize (DE-Offenlegungsschrift No. 2,009,105).

Since the noise emission of the propeller is especially dependent on the blade-tip Mach number, it is known to decrease the generation of noise by reducing the blade tip Mach number. A decrease of the blade-tip Mach number is necessarily connected with a loss of thrust. Accordingly, additional precautions have to be taken in order to compensate this loss of thrust. Generally, these measures involve changes to the propeller and/or the arrangement of a gear between engine and propeller. Accordingly, this approach, too, is generally expensive.

SUMMARY OF THE INVENTION

It is the object of the invention to create a method and a device for reducing the overflying noise on the basis of noise reduction by interference extinction using a source of antisound, which can be realized with existing airplanes at only slight expense, or can be applied to new airplanes without additional components.

Starting from the method according to the preamble of the patent claim 1, this object is achieved according to the invention with the features set forth in the characterizing part of claim 1.

Advantageous embodiments of the method and a device for carrying out the method are the subject of the subclaims.

With existing airplanes, the method according to the invention can also be used without substantial re-equipment expense to achieve a reduction in the A-weighted level, and also in the linear noise level, which leads to a marked alleviation of the environment.

BRIEF DESCRIPTION OF THE DRAWINGS

The invention is illustrated by example in the drawing and described below in detail with the aid of the drawing, in which FIG. 1 shows the pressure-time curve of the propeller signal of a three-blade propeller;

FIG. 2 shows the A-weighting of propeller noise spectra;

FIG. 6 shows, in tabular form, different ratios of propeller blade pressure signals and engine cylinder pressure signals.

DESCRIPTION OF THE PREFERRED EMBODIMENT

With relatively small propeller airplanes of general aviation the important sources of sound or noise are the propeller and the engine exhaust. As represented in FIG. 1, the propeller noise consists in time variation of a sequence of signals, which possess positive and negative components, one signal corresponding to each blade for one propeller revolution. As may be seen in FIG. 1, the positive components, that is the components of the noise on the pressure side, are approximately saw-tooth shaped. By contrast, at normal speeds of the propeller, a relatively narrow peak is formed on the underpressure side.

Figure 3:
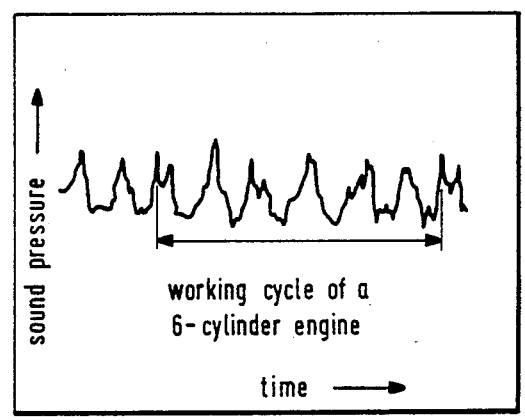
FIG. 3 shows the pressure-time curve of the engine signals of a 6-cylinder engine.
Figure 4:
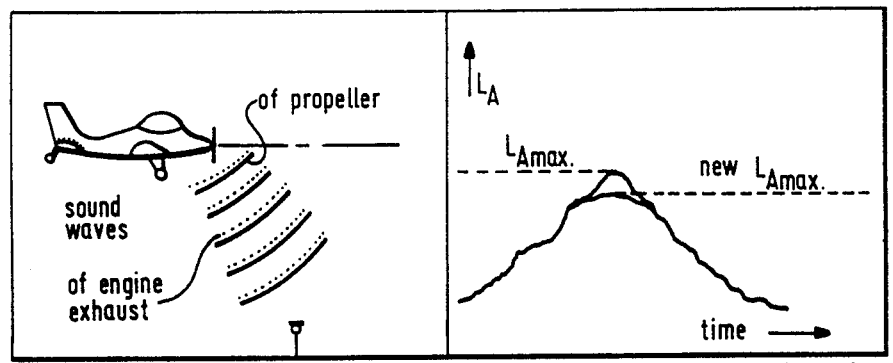
FIG. 4 shows a schematic representation of the noise measurement during overflying, and the time curve of A-weighted levels.
Figure 5:
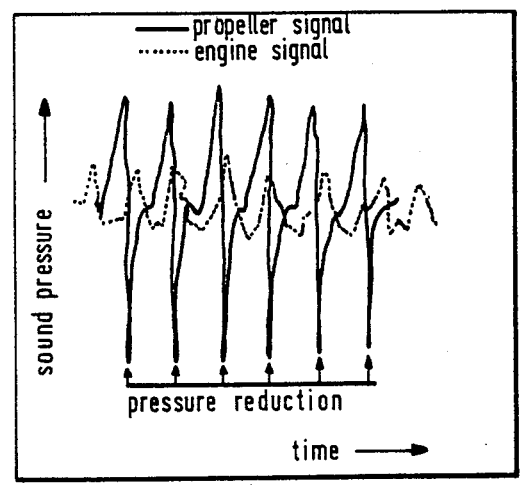
FIG. 5 shows the phase coordination of engine and propeller signal for reducing the emitted signal amplitude given in a combination of a 6-cylinder four-stroke engine having a three.-blade propeller.

No zero lines are plotted in the measurement diagrams in FIG. 1, or FIGS. 3 and 5, which are to be described below. The unweighted sound pressure level of the propeller is designated by $L_P$, the weighted level by $L_{PA}$. The weighted overall sound pressure level is $L_A$ (FIG. 4).

Narrow-band analysis of signal sequences represented in FIG. 2 shows that these peaks provide a noise spectrum having higher frequency components, from which, in turn, the A-weighted level is essentially formed. The narrower the underpressure peaks, the higher the A-weighted level, which is decisive for the licensing of propeller airplanes—equal output-amplitudes being assumed.

The engine noise likewise consists of signal sequences, a signal corresponding to each working cycle of a piston. Like the propeller signals, the individual engine signals consist of positive and negative components, as emerges from the pressure-time curve of the engine signal of a 6-cylinder four-stroke engine represented in FIG. 3. As may be seen from this diagram, each engine pressure signal has its own characteristics, which result from differences in the cylinder outlets and the formation of pressure signals in the exhaust system.

In practice, the signal sequences of engine and propeller are propagated in the form of randomly arranged sound waves. During measurement of overflying noise, these sound waves are received by a microphone set up on the ground. The A-weighted level of such a recording is represented in time variation in FIG. 4 on the righthand side, the level reaching a $L_{Amax}$.

According to the invention, the propeller is now arranged on the drive shaft in such a way that propeller sound pressures fall on engine sound pressures in antiphase, so that the propeller sound pressure signals are attenuated by interference, whereby the total sound emitted by the airplane is reduced. Preferably, the propeller is arranged so that positive components of the engine sound pressure fall on negative components of the propeller sound pressure. In this way, there is a superposition of the propeller signals and the motor signals, as is represented in FIG. 5. With this arrangement, the negative components of the propeller sound pressure are thereby reduced in each case by the fraction of the positive component of the engine sound pressure in antiphase thereto, so that there is an overall noise reduction, especially a reduction of the A-weighted level, which can lie in the order of magnitude of several dB.

The effect on which the noise reduction is based does not occur symmetrically to the airplane axis. However, it can be guided in the desired direction—here, onto the residential areas underneath the airplane—by arranging the propeller on the drive shaft so as to produce the superposition described above of the positive components of the engine sound pressure and the negative components of the propeller sound pressure with regard to the downwardly directed sound waves. In this connection, the noise reduction can be further improved by increasing the engine sound pressure, e.g. by operating the engine with a reduced sound insulation. Since a reduced sound insulation of the engine would probably not be tolerable on the ground, it can be considered to equip the engine with a variable, as the case may be controllable, sound insulation. To this end, in the simplest case it would be possible to provide upstream of the silencer, in the wall of the exhaust pipe, an opening, which can be opened or closed by means of a flap. In this connection, this opening with the flap can be arranged so that the sound pressure is emitted in the direction in which it is aimed to achieve the optimum in the superposition of sound pressure, and thereby in the noise reduction. Moreover, a controllable bypass can be provided for the silencer.

It has been assumed above that a cylinder pressure signal in the time representation falls on each propeller blade pressure signal. This is the case, for example, with a 4-cylinder four-stroke engine having a two-blade propeller, but also with a 4-cylinder two-stroke engine having a four-blade propeller. By contrast, with a 6-cylinder four-stroke engine having a two-blade propeller, only every second propeller blade pressure signal would fall on an engine cylinder pressure signal. Here, too, there would still be a noise reduction. A corresponding result holds for drives in which a reduction gear is provided between the engine shaft and the propeller. Generally, the number of the engine ignitions per revolution of the propeller shaft and the number of the propeller blades must have an integer ratio one to another. Preferably, a ratio of 1 is to be aimed at, at which the maximum noise reduction is achieved.

FIG. 6 reproduces the ratios of the number of the propeller blade pressure signals to the number of the engine cylinder pressure signals for different possible engine/propeller combinations with and without gears. A noise reduction for each propeller blade pressure signal occurs where the magnitude of the ratio B/C is equal to 1. Higher numbers signify a correspondingly worse result.

If, for the purpose of active attenuation of each blade pressure signal, a cylinder pressure signal can be provided in the appropriate phase, B/C=1 is an optimum result. For attenuation of half or a third of the blade pressure signals, the characteristic figure B/C=2 or 3 is an average result. The characteristic figure B/C=4 occurs if, for the purpose of attenuating four blade pressure signals, only one cylinder pressure signal is available phase-true, i.e. in antiphase.

The reduction of noise is a special problem with ultralight airplanes. Normally, ultralight airplanes operate using a reduction gear, which is often chosen arbitrarily. By choosing a reduction gear with integer reduction ratio, it is possible, as may be seen from FIG. 6, to achieve noise reductions in the manner according to the invention for the combinations given there. In ultralight airplanes, the propeller is often driven by vee-belts with gearing down. To achieve the mode of operation according to the invention it is, of course, necessary to avoid the slippage necessarily arising hereby. Accordingly, it is necessary to use slip-avoiding toothed belts, or the like, for the reduction gear with belt transmission. For reduction gears with toothed belts it is also possible to set the phase angle of the sound pressures of the engine and of the propeller in a simple fashion.

The method is suitable both for fixed propellers and also for variable—constant speed—propellers. As mentioned, in this connection the propellers can be arranged directly on the engine shaft, or via a reduction gear.

To carry out the method it is necessary only to make the flange of the engine and of the propeller adjustable in such a way, or to provide them with bores in such a way as purposefully to achieve the phase coordination of engine overpressure and propeller underpressure which leads to a reduction of the contributed signal amplitude. With existing airplanes, a noise reduction may be achieved without substantial expense by using an adaptor disk, with which it is possible to twist the propeller flange relative to the engine flange in such a way that the negative pressure components of the propeller signal and the positive pressure components of the engine signal fall on one another in phase, in each case.

What is claimed is:

1. A method of attenuating overflying noise of an airplane in a predetermined direction, the airplane including a propeller having a predetermined number of blades mounted on a propeller shaft and a piston engine driving the propeller shaft, wherein the piston engine has a predetermined number of ignitions per revolution of the propeller shaft, the number of engine ignitions per revolution of the propeller shaft divider by the number of blades of the propeller being a whole integer from one to four, said predetermined direction being radial with respect to said propeller shaft, said method comprising the step of arranging the propeller shaft relative to said engine so that sound pressure signals generated by the propeller are substantially in antiphase with sound pressure signals generated by the engine in said predetermined direction whereby the propeller sound pressure signals in said predetermined direction are attenuated by interference with the engine sound pressure signals to reduce the overflying noise emitted by said airplane in said predetermined direction.

2. In the method of claim 1, said engine including an exhaust silencer having a variable efficiency a magnitude of the sound pressure signals generated by said engine being variable by varying the efficiency of said exhaust silencer.

3. In the method of claim 1, the direction of the sound pressure signals emitted by said engine being variable.

4. The method of claim 2 further comprising the step of adjusting said exhaust silencer to adjust the magnitude of the sound pressure signals generated by said engine in order to reduce the overflying noise emitted by said airplane.

5. The method of claim 3 further comprising the step of adjusting the direction of the sound pressure signals emitted by said engine to reduce the overflying noise emitted by said airplane.

* * * * *